United States Patent [19]
Brandl

[11] 3,962,987
[45] June 15, 1976

[54] APPARATUS FOR SPRAYING PROCESSING FLUID ON THE INTERNAL SURFACE OF A GREEN TIRE

[75] Inventor: Josef Brandl, Mallersdorf-Pfaffenberg, Germany

[73] Assignee: Peter Ilmberger KG, Maschinen-u. Zahnradfabrik, Germany

[22] Filed: July 26, 1974

[21] Appl. No.: 492,018

[30] Foreign Application Priority Data
Dec. 6, 1973  Germany............................ 2343180

[52] U.S. Cl.................................. 118/44; 118/318; 118/321; 118/322
[51] Int. Cl.². ............................................ B05C 7/02
[58] Field of Search ............. 118/318, 44, 321, 322; 254/50.2, 50.3

[56] References Cited
UNITED STATES PATENTS

| | | | |
|---|---|---|---|
| 2,173,738 | 9/1939 | Urquhart et a................... | 118/44 |
| 2,787,979 | 4/1957 | Verba et al......................... | 118/318 |
| 3,825,965 | 7/1974 | Root et al......................... | 118/318 X |

FOREIGN PATENTS OR APPLICATIONS

| | | | |
|---|---|---|---|
| 167,628 | 1/1965 | U.S.S.R............................. | 118/318 |

*Primary Examiner*—John P. McIntosh
*Attorney, Agent, or Firm*—James E. Nilles

[57] ABSTRACT

A method and apparatus for spraying a processing fluid on the internal surface of an unfinished or green tire blank. The apparatus holds the tire in a horizontal position and first grasps the upper side wall of the tire and then pulls the tire downwardly to spread it apart so that the processing fluid can be sprayed over the entire internal surface including the beaded edge. The method includes clamping the green tire in a horizontal position by its upper bead, then grasping the lower bead and pulling the tire apart to its open position where its internal surface is fully exposed and rotating the tire as the internal surface is sprayed completely, including the beaded edges.

14 Claims, 5 Drawing Figures

3,962,987

APPARATUS FOR SPRAYING PROCESSING FLUID ON THE INTERNAL SURFACE OF A GREEN TIRE

BACKGROUND

Various types of spreading apparatus have been proposed for coating the inside of a completed tire. Such prior art devices are shown in the U.S. Pat. No. 1,471,787, issued Oct. 23, 1923 and in which loosely journalled spreader rollers contacted the interior surface of the tire. Consequently, the rollers engaged the freshly sprayed interior and this resulted in irregularly thick layers of the spray liquid and also resulted in the formation of small, loose particles of the liquid which tend to stick to the interior surface of the tire.

Another example of the prior art is shown in the U.S. Pat. No. 2,850,263, issued Sept. 2, 1958. That tire spreader attachment also related to finished tires and not green or unfinished tires, and that apparatus utilized a split ring for grasping and supporting the beaded edges of the tire. As a result, the entire interior of the tire, including the beaded edges, could not be thoroughly covered with the spray material.

SUMMARY OF THE INVENTION

The present invention provides apparatus for supporting the tire in a horizontal position and insuring that the spray material completely covers the interior of the green tire, including its beaded edges. The tire is supported in a horizontal position by its upper bead and the weight of the tire then aids a lower clamp element to pull the tire downwardly, thereby completely exposing the interior of the green tire. The arrangement is such that there are no obstructions located within the spread apart tire and as the relatively soft and sticky green tire is rotated, the spray material is applied to evenly and completely coat the entire inner surface of the green tire.

In a preferred form of the apparatus, first and second grasping devices are used for tensioning the tire rims of a green tire at least one of which may be moved away from the other to an operating position and for pulling the rims apart. In order to insure reliable anchoring of the tensioning or grasping elements, the grasping elements of each tensioning device are fastened on a common member.

DESCRIPTION OF A PREFERRED EMBODIMENT

Figure 1:
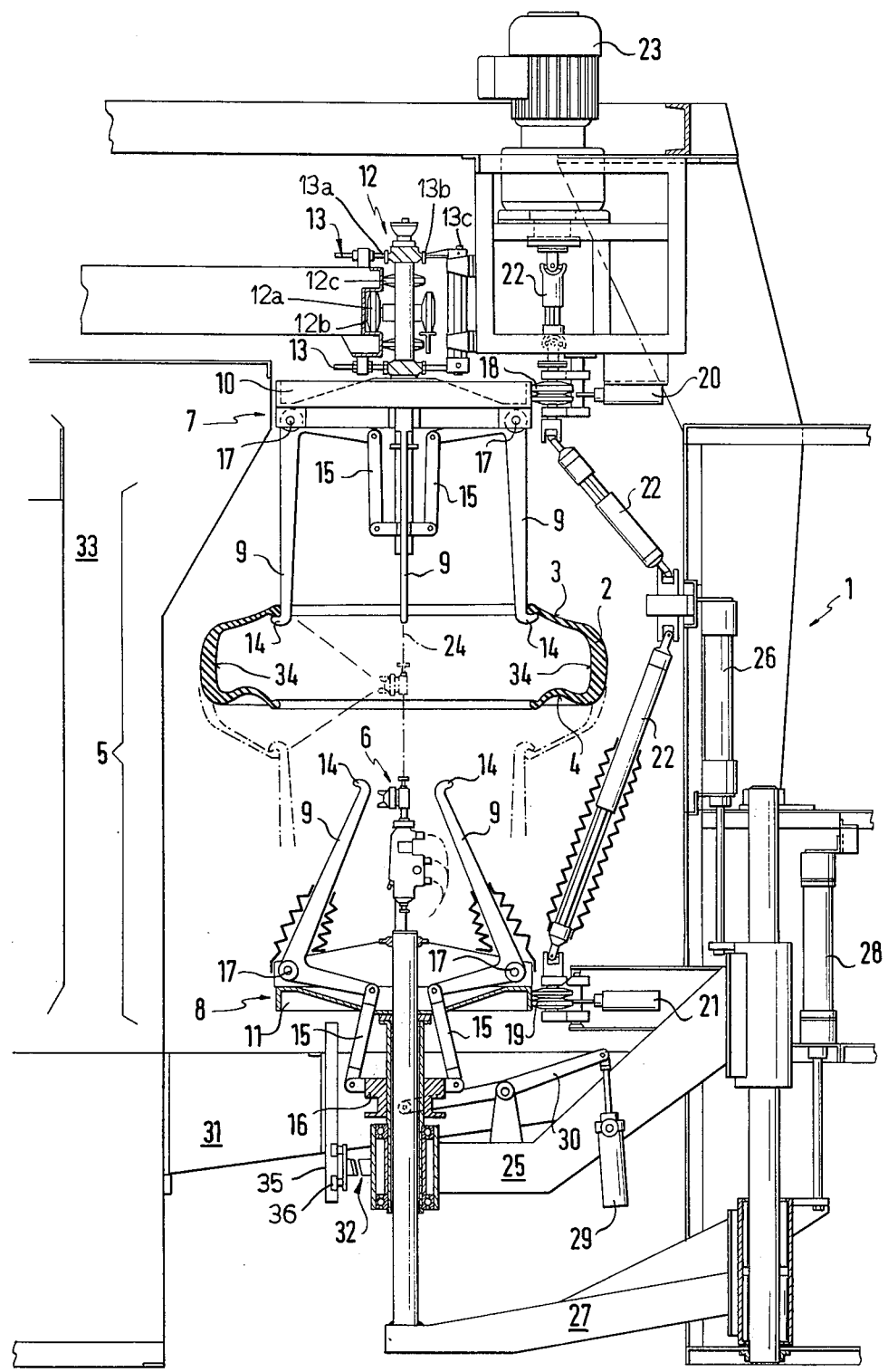
FIG. 1 is an elevational view of an apparatus embodying the present invention, certain parts being shown in section for the sake of clarity, and showing a tire before it is spread apart.

The present invention relates to the coating of the interior of an unfinished or green tire and a processing fluid at this stage of the manufacture must be spread evenly on the entire internal surface of the tire, including the beaded edges of the tire. In processing a green tire, care must be exercised because it is sticky or adhesive and still soft, as compared to a finished tire which has hardened, and such a "green" tire can be easily damaged.

For the purpose of illustrating the invention, a green tire blank 2 having relatively flexible or thin side walls 3 and 4 is clamped in a horizontal position in the apparatus 1 of the present invention. A spreading mechanism 5 is utilized to spread the tire apart, as will appear, and a spraying system 6 is also provided centrally of the apparatus which is vertically positionable within the interior of the tire.

The spreading mechanism comprises a first grasping device 7 and a second grasping device 8 which are opposed to one another in oppositely facing, spaced relationship. Each of the grasping devices 7 and 8 has spreadable grasping elements 9 which are fastened on their common bearers 10 and 11, respectively. Each of the bearers 10 and 11 is formed in the shape of a plate and is rotatably journalled as clearly shown in the drawing. The plate 10 is fastened on a conveyor chain 12 which serves the purpose of conveying the tire blanks 2 during the processing operation. The chain 12 includes pairs of rollers 12a disposed about horizontal axes and which rollers ride in on track means 12b. The chain also has pairs of rollers 12c disposed about vertical axis and riding against track means 12d.

Means are provided for immobilizing the upper grasping device 7 at a position situated immediately above the other grasping device 8. This immobilizing or securing means 13 comprises two longitudinal guides 13a which is fixed and 13b which is pivoted at 13c and pivotally shifted by a cylinder means 13d. When it is desired to secure the upper grasping device 7 in position above the lower device 8, the cylinder means 13d swings guide 13b into contact with the chain and clamps the latter against guide 13a.

Figures 2, 5:
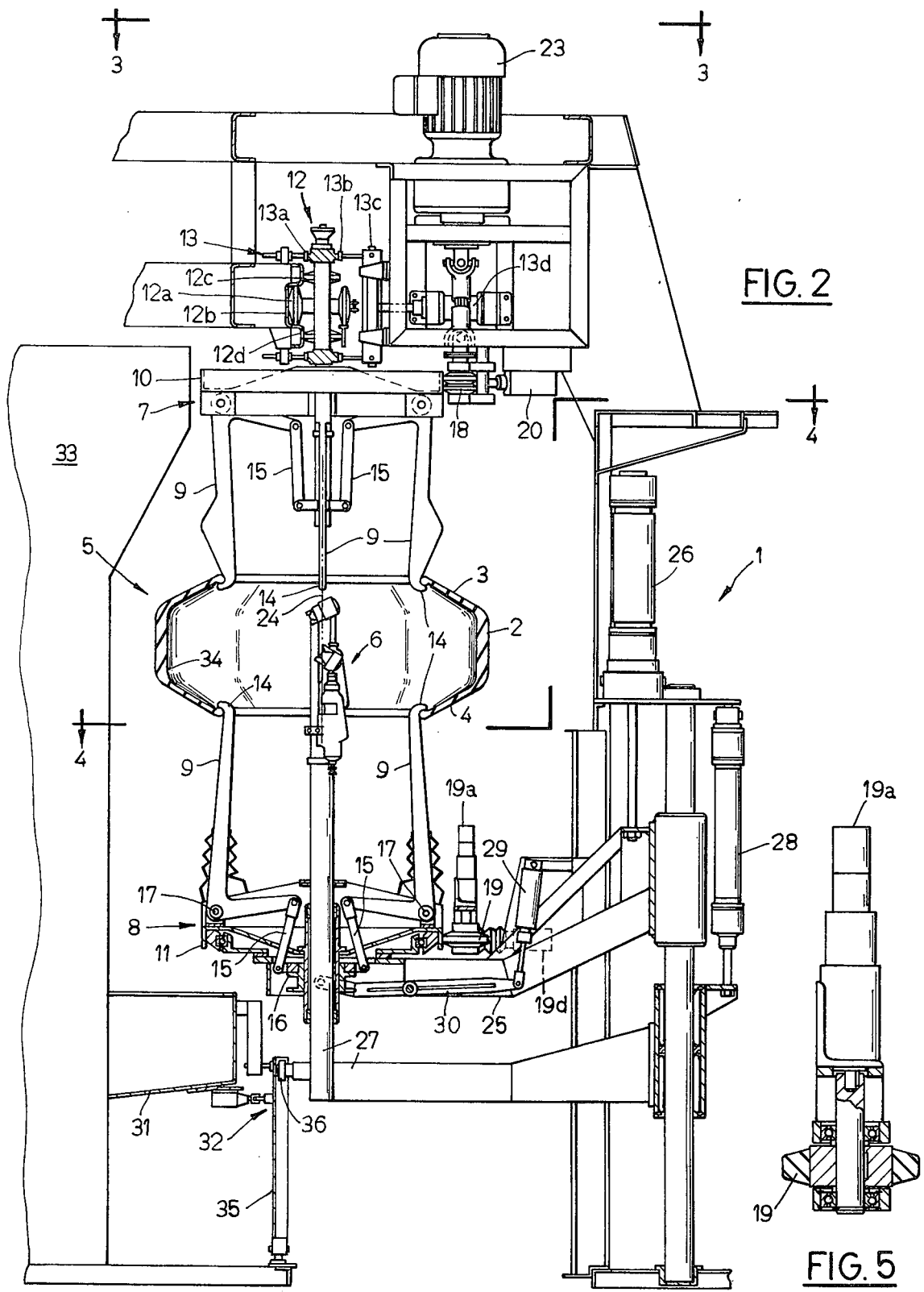
FIG. 2 is a view similar to FIG. 1, but showing a modified form for driving the lower grasping device, and also showing the tire in the spread apart position.
FIG. 5 is an enlarged fragmentary view of the air motorroller shown in FIG. 2, partially in section.
Figure 3:
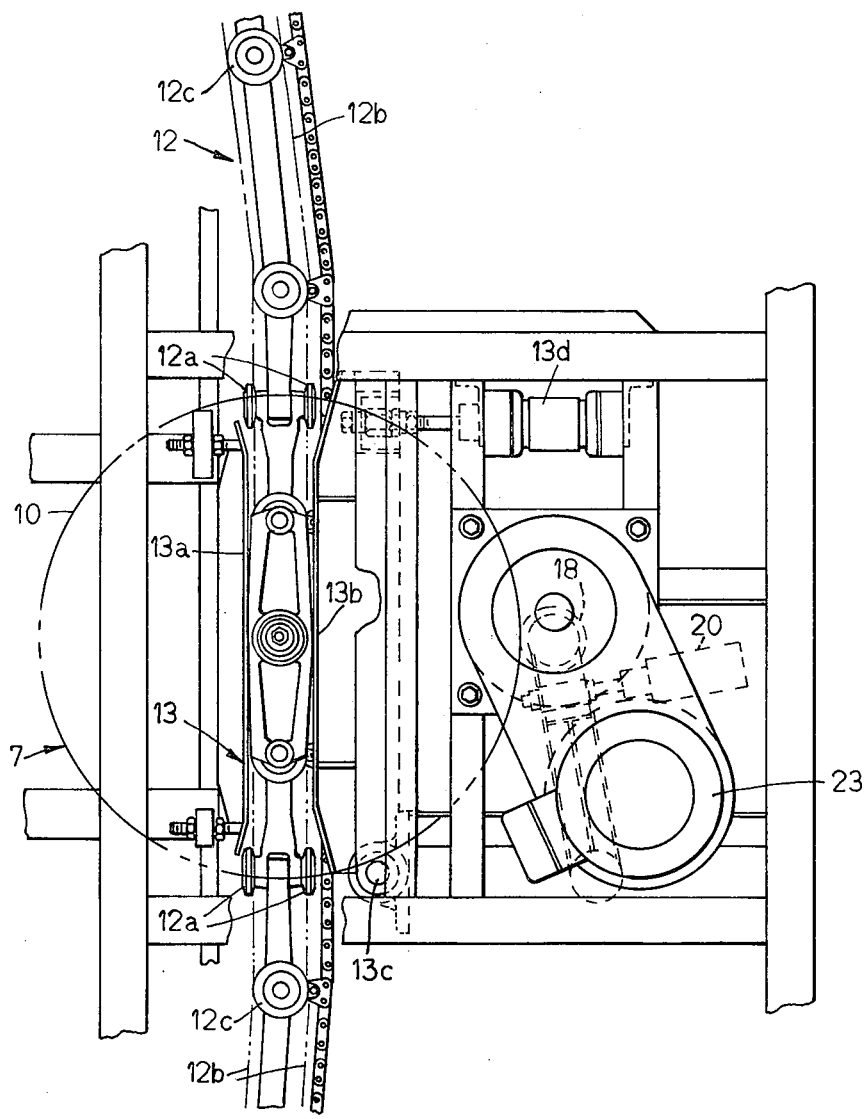
FIG. 3 is a horizontal view taken generally along the line 3—3 in FIG. 2.

The grasping elements 9 of the two grasping devices 7 and 8 are produced in the form of angled double-armed levers which at one extremity have a grasping hook 14, while being connected at the other extremity to an intermediate lever 15. As apparent in particular in the case of the second grasping device 8, these intermediate levers 15 are connected to a slider 16 which is axially displaceable in the direction of the tire axis and whereof the displacement is accompanied by a pivotal displacement of the grasping elements 9 around their pivots 17. The rotatably arranged bearer 10, precisely like the bearer 11, has its edge in contact with a corresponding friction roller 18 or 19, which is thrust against the bearer against the force of a return spring, which is not shown, by means of a contact thrust means 20 or 21. As shown in the embodiment of FIG. 1, the two friction rollers 18 and 19 are coupled to a common driving system 23 through universal joint shafts 22. As shown in the embodiment of FIGS. 2–5, the lower roller 19 is separately driven by an air motor 19a directly connected thereto (FIG. 5).

Figure 4:
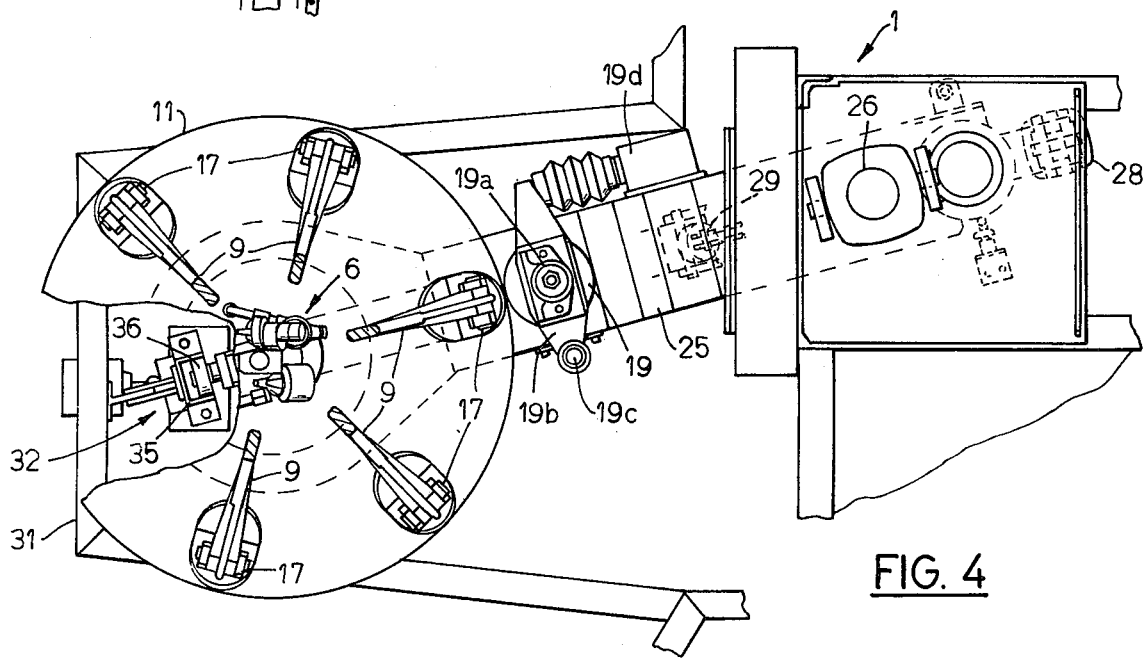
FIG. 4 is a horizontal sectional view taken along line 4—4 in FIG. 2, certain parts being shown as broken away or removed for clarity.

As shown clearly in FIG. 4, the roller 19 and the air motor 19a are mounted on a lever 19b pivoted at 19c. The lever 19b is pivotally swung by cylinder means 19d between a position for rotatably driving bearer 11 and a position away from the bearer 11.

Like the spraying system 6, the lower grasping or tensioning device 8 is arranged for axial displacement in the direction of the tire axis 24 and is thereby displaceable from the standby position shown in FIG. 1 into an operating position shown by dotted lines. To this end, the lower grasping device 8 is installed on a lever 25 which is displaceable along the tire axis 24 by means of a controllable piston-cylinder system 26.

The spraying system 6, which is centrally situated within the lower grasping means 8, is firmly secured on a lever or frame 27 which is vertically displaceable by means of a controllable piston-cylinder system 28. On the lever arm 25 is situated a piston-cylinder system 29 which is coupled to the slider 16 through a transmission lever 30.

Stabilizing means 32 provide stability during a pivoting displacement of the bearer 10 or 11, and are mounted on a framework 31 of the device. More specifically, roller means 36 is mounted on frame 27 and rides in the vertical guide track 35 carried by the main frame 31.

In the direction of the spraying action of the spraying system 6, being towards the left in the illustration shown, the framework 31 of the device has a suction system 33 receiving trickling water. The following actions occur during operation. The conveyor chain 12 offers-up a first grasping device 7 until it is positioned precisely above the second grasping device 8. The securing means 13 then come into action, i.e., it immobilizes the grasping device 7. The friction rollers 18 and 19, which had not been in contact with the bearers 10 and 11 until then, are now thrust against the bearers by means of the thrust means 20 and 21. The first grasping device 7 is already charged with a tire blank 2, i.e., the grasping hooks 14 of the grasping arms 9 enflank the upper rim of the tire blank 2 in a form fit. The tire blank 2 had been received by the first grasping device 7 at another station.

When the first grasping device has been immobilized in its position above the second grasping device, the second grasping device as well as the spraying system, are displaced upwards into the tire aperture by actuation of the piston-cylinder systems 26 and 28. An actuation of the piston-cylinder system 29 causes the grasping arms to spread apart laterally. The thrust of the grasping arms on the tire rim is adjustable by means of a separate pressure reduction device, which is not shown. When the grasping arms bear on the rim, the piston-cylinder system 26 is reversely actuated and the second grasping device 8 is drawn away downwards. The grasping hooks 14 of the grasping arms 9 then come into form-fitting contact with the second rim of the tire blank 2 and entrain the latter downwards. The force with which the tire blank is stretched may equally be adjusted by means of a separate pressure reduction device. The tire is thus spread open so far that no point of the internal surface 34 remains unsprayed during the then following spraying operation. The spraying system 6 always sprays only in the direction shown. During the spraying operation, the tire is turned in its symmetry plane by means of friction rollers 18 and 19 and of the driving system 23. The suction device 33 receiving trickling water, serves the purpose of removing the droplets sprayed beyond the tire surface 34, by suction. The spraying operation of the spraying system is stopped once the tire has been turned through at least 360°. The grasping device 8 is raised again, whereupon the grasping arms 9 are pivoted inwards again. The second grasping device 8 returns to its standby position again, together with the spraying system 6.

In the absence of other scheduled operations, the tire blank may be removed from the first grasping device after the drying of the processing fluid sprayed on.

The invention is not limited to the example of embodiment shown. It may be envisaged, without any impediment, to equip the first grasping device with tensioning arms for both rims. It is possible moreover to envisage making the spraying device rotatable instead of the grasping device, or operating through a 360° taper nozzle.

I claim:

1. An apparatus for spraying processing liquid on the interior surface of green tires having inwardly inclined sides, said apparatus comprising a spreading means for spreading the green tire as well as spray means for spraying the interior tire surface, characterized in that the spreading means includes two opposite, vertically spaced rotatably mounted grasping means for clamping the tire beads in a horizontal position, the lower of said grasping means being vertically shiftable from a lower standby position into a raised operative position for grasping one of said tire beads whereby said tire bead may be pulled downwardly, in order to spread the beads, and drive means for rotating said grasping means, said spraying means being concentrically arranged within said lower grasping means and vertically shiftable between spraying and non-spraying positions.

2. An apparatus as set forth in claim 1 further characterized in that the grasping means comprise shiftable grasping elements for engaging said tire.

3. The apparatus set forth in claim 2 further characterized in that the grasping elements of each grasping means are fastened to a common bearer.

4. An apparatus according to claim 3 further characterized in that each of said bearers are rotatable.

5. The apparatus as set forth in claim 4 further characterized in that said bearers are plates.

6. An apparatus according to claim 5 including friction rollers for engaging an edge of at least one of said plates and for driving the latter.

7. The apparatus as set forth in claim 6 further characterized in that the friction rollers are coupled to a common drive through universal joints shafts.

8. An apparatus for spraying processing liquid on the interior surface of a green tire having inwardly inclined sides and opposite beaded edges, said apparatus comprising a spreading means for spreading the green tire and spray means for spraying the interior tire surface, said spreading means including vertically spaced rotatably mounted opposing upper and lower grasping means for grasping said beaded edges only at circumferentially spaced locations and supporting said tire in a horizontal position and about a generally vertical axis, said lower grasping means being vertically shiftable generally along said axis for grasping one of said beaded edges and for pulling said one beaded edge downwardly to spread said opposite beaded edges means supporting said nozzle within said tire while in said spaced position, and drive means for rotating said grasping means.

9. Apparatus as described in claim 8 further characterized in that each of said grasping means includes a plurality of shiftable arms having free ends that are radially shiftable with respect to said tire and for grasping said beaded edges, and power means for shifting said arms.

10. Apparatus as set forth in claim 9 further characterized in that said spraying means is concentrically arranged within said lower grasping means and is vertically shiftable between spraying and non-spraying positions.

11. Apparatus as set forth in claim 8 including an endless conveyor chain, said upper grasping means is located on said endless conveyor chain for movement between a position above said lower grasping means and a position removed from above said lower grasping means whereby said tire can be conveyed by said upper grasping means to a position directly above said lower grasping means.

12. The apparatus set forth in claim 8 further characterized in that the means for rotating said grasping means comprises a separate motor for each of said grasping means.

13. The apparatus set forth in claim 12 further characterized in that the motor means for the lower grasping means comprises a swingable lever, a roller mounted on said lever for abutting against said grasping means and a motor mounted on said lever for swinging therewith and for driving said roller.

14. The apparatus set forth in claim 8 including a conveyor chain, one of said grasping means being mounted on said conveyor chain for movement to a position above the other grasping means, and guide means for clampingly engaging said conveyor chain when its grasping means is located above the said other grasping means.

* * * * *